United States Patent [19]

Mayernik

[11] 4,198,869
[45] Apr. 22, 1980

[54] APPARATUS FOR PERMANENTLY INDICATING MAXIMUM GAS PRESSURE IN A SYSTEM

[75] Inventor: Andrew B. Mayernik, McKeesport Borough, Pa.

[73] Assignee: United States Steel Corporation, Pittsburgh, Pa.

[21] Appl. No.: 13,769

[22] Filed: Feb. 21, 1979

[51] Int. Cl.² .................................................. G01L 7/16
[52] U.S. Cl. ................................................ 73/709; 73/35
[58] Field of Search .................. 73/709, 700, 35, 744

[56] References Cited

U.S. PATENT DOCUMENTS

| 2,212,547 | 8/1940 | Morseman | 73/35 |
| 2,583,004 | 1/1952 | McCorkle | 73/35 |
| 3,525,250 | 8/1970 | Hurst | 73/700 |

FOREIGN PATENT DOCUMENTS 2253209 6/1975 France .
571219 11/1975 Switzerland .

Primary Examiner—Donald O. Woodiel
Attorney, Agent, or Firm—William F. Riesmeyer

[57] ABSTRACT

An improved apparatus for measuring the maximum pressure of gas in a system by use of the Brinell principle. In preferred form, the apparatus of the invention is mounted in a plug fitting in the end of a steel cylinder for transporting gases under pressure. The plug has a partial bore extending from the inner end outwardly. A sample is fixed in position adjacent the outer end of the bore. A penetrator is slidably mounted in the bore and has an indentor facing the sample. The penetrator is forced by pressure of the gas against the sample leaving an indentation thereon indicative of the maximum pressure attained in the cylinder over its service life. A vent from the outer end of the plug to the bore prevents buildup of gas pressure between the penetrator and the sample due to leakage of gas along the passage and prevents inaccurate readings.

4 Claims, 4 Drawing Figures

APPARATUS FOR PERMANENTLY INDICATING MAXIMUM GAS PRESSURE IN A SYSTEM

BACKGROUND OF THE INVENTION

This invention relates to apparatus for providing a permanent indication of the maximum pressure of gas in a system.

Presently, if failure of a pressure vessel occurs, suitable evidence is not available in many cases to indicate whether the failure may have been caused by overpressurization or is due to other factors. Devices such as direct reading gages, relief valves, and recording devices mounted externally in the system are usually lost or destroyed when an explosion has occurred. Determination of the cause of the failure depends in such cases on metallurgical or physical inspections of the remains of the vessel and are often not conclusive.

Similarly, when a vessel is returned for the standard 5 year inspection, a reliable record is often not available to indicate the complete history of pressures to which the vessel has been exposed. If such data were available, it would be possible to select certain vessels which have been exposed to higher than normal service pressures for additional, more stringent screening tests, such as ultrasonic inspection.

Apparatus for indicating the maximum force exerted on a structural member by using the Brinell principle is shown in Swiss Pat. No. 571,219 and French Pat. No. 2,253,209. These patents do not suggest that such apparatus could be used to indicate gas pressure or how this could be done.

It is, therefore, the primary object of this invention to provide apparatus utilizing the Brinell principle for indicating the maximum pressure of gas in a system.

SUMMARY OF THE INVENTION

The improvement of this invention includes a housing having an inner end exposed to the pressurized gas in a system and an outer end exposed to the atmosphere. A passage extends outwardly from the inner end partially through the housing. A sample of uniformly compressible material is fixedly mounted in the passage adjacent its outer end. A penetrator is mounted adjacent the inner end of the passage and has an indentor facing the sample. Means is provided for retaining the penetrator in the passage without preventing flow of gas to the penetrator. The penetrator is slidably movable along the passage in a fashion such that its axis remains substantially parallel to the axis of the passage. Some of the gas from the vessel inevitably leaks along the passage to the sample. A vent is, therefore, provided extending from the outer end of the housing to the passage at a location effectively preventing buildup of gas pressure between the penetrator and the sample so as to prevent inaccurate readings.

BRIEF DESCRIPTION OF THE DRAWINGS

The above and other objects, features and advantages of the invention will become more apparent from the following detailed description when taken in conjunction with the appended claims and drawings in which:

DESCRIPTION OF THE PREFERRED EMBODIMENT

Figure 1:
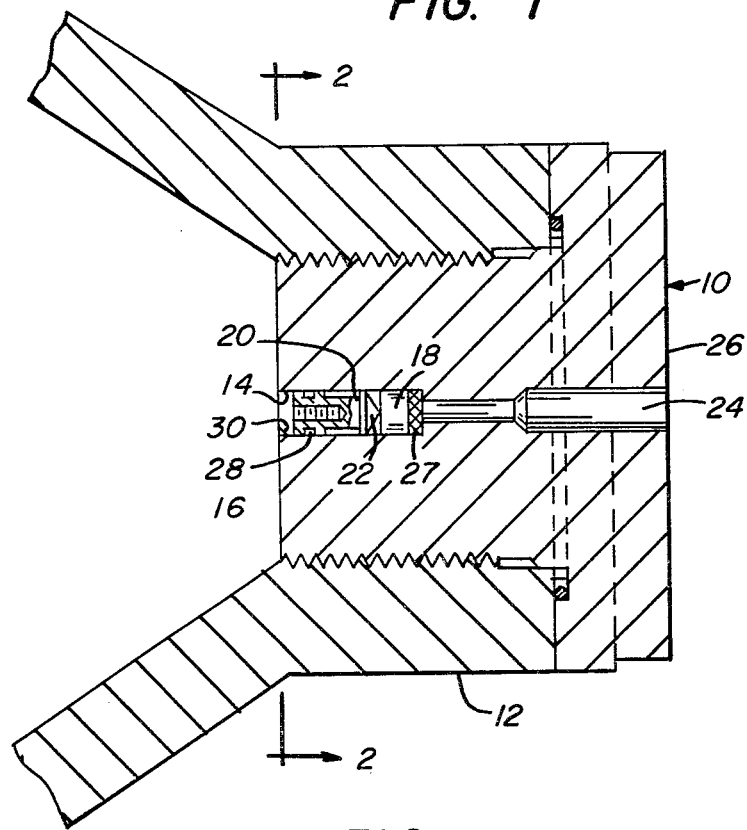
FIG. 1 is a partial cross sectional view of a cylinder having a plug inserted in the end thereof, including the apparatus of this invention within said plug.
Figure 2:
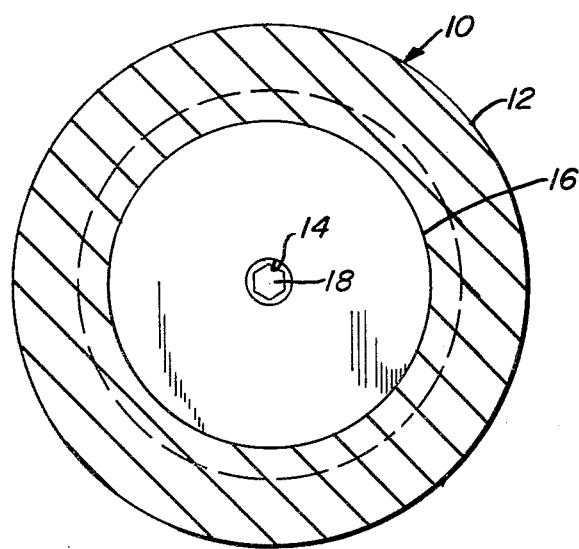
FIG. 2 is a view taken at 2—2 of FIG. 1 with the penetrator removed so that the sample is exposed.

As shown in FIG. 1, plug 10 is mounted in one end of a forged steel cylinder 12 used for transport or storage of gases. A straight longitudinal passage 14 extends outwardly from inner end 16 partially through the plug. A sample 18 of uniformly compressible material is mounted adjacent the outer end of passage 14. A penetrator 20 is slidably mounted in passage 14 and has an indentor 22 facing sample 18. Penetrator 20 is designed to be of sufficient length and of cross sectional size such that there is a mimimum of clearance between the penetrator and the passage 14 such that the axis of the penetrator remains substantially parallel to the axis of the passage as the penetrator moves therealong. I use a Rockwell C Brale penetrator with a conical diamond indentor. Of course, the penetrator could be supported in a mounting in larger passages. The term penetrator in the claims is intended to include this possibility. Even with minimum clearance gas will leak past the penetrator along the passage walls to the sample. To prevent pressure buildup between the sample and penetrator, and any inaccurate readings which may be caused thereby, I provide a vent 24 extending from the outer end 26 of plug 10 to passage 14. As shown in FIG. 2, sample 18 is preferably of polygonal shape to provide space between the sample and the passage walls so that gas will flow to the vent. Also in preferred form, porous spacer means 27 (FIG. 1) is provided as a seat for sample 18 to insure that gas can flow to vent 24. I use a porous metal spacer of AISI Type 316 Stainless Steel such as that produced by Porous Metal Products Company. Sealing means is provided in the form of an O-ring 28 mounted about the periphery of penetrator 20. I use a Viton base 90 Durometer Hardness model 709 0-ring manufactured by Parker Company. Means for retaining penetrator 20 in the passage without preventing flow of gas thereto, is provided by stake notch 30 on the inner end of passage 14. Sample 18 is fixed in position in passage 14, preferably as shown, by the limited length of passage 14.

Figure 3:
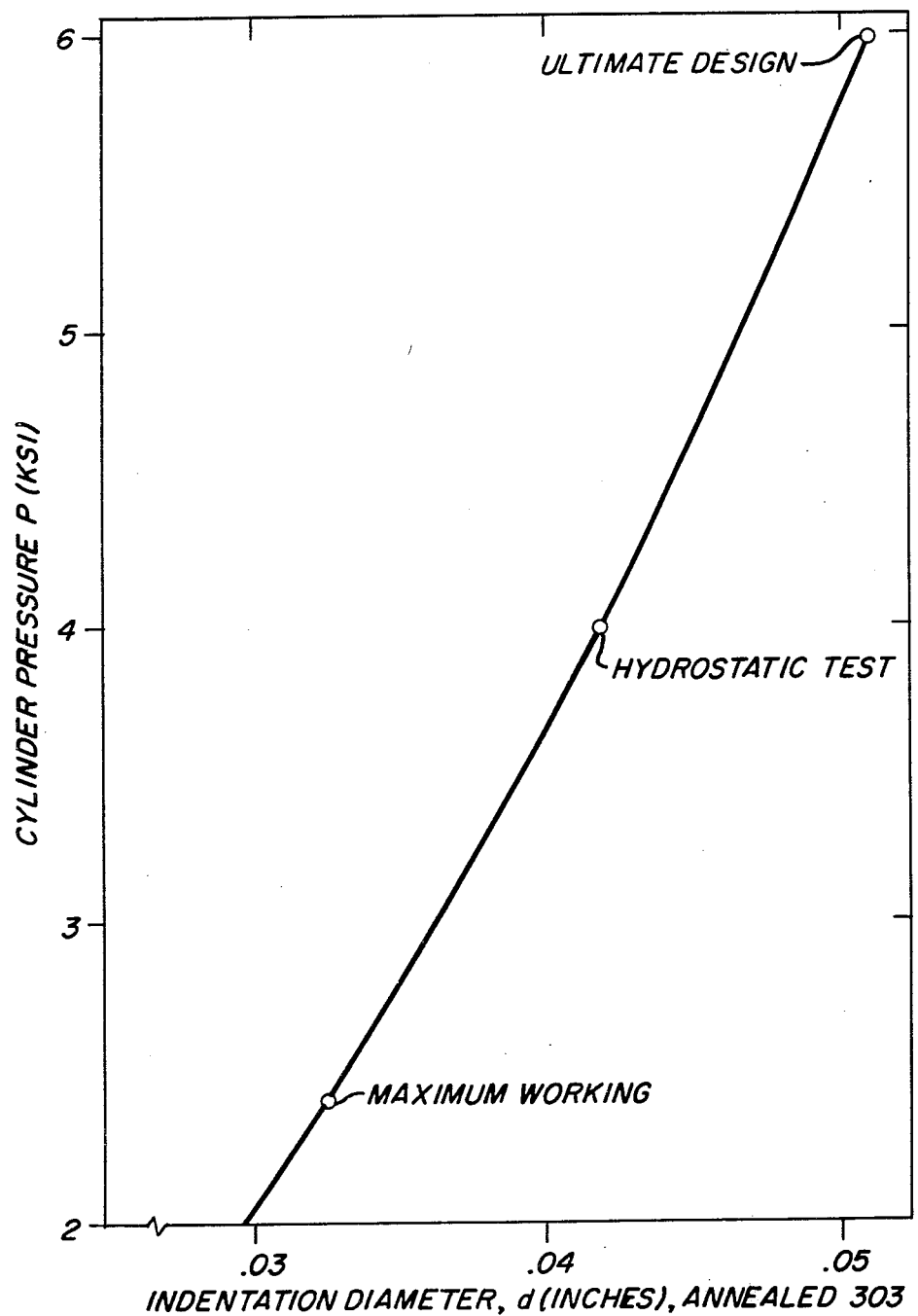
FIG. 3 is a calibration curve for indentation diameter in a sample of annealed AISI Type 303 steel.
Figure 4:
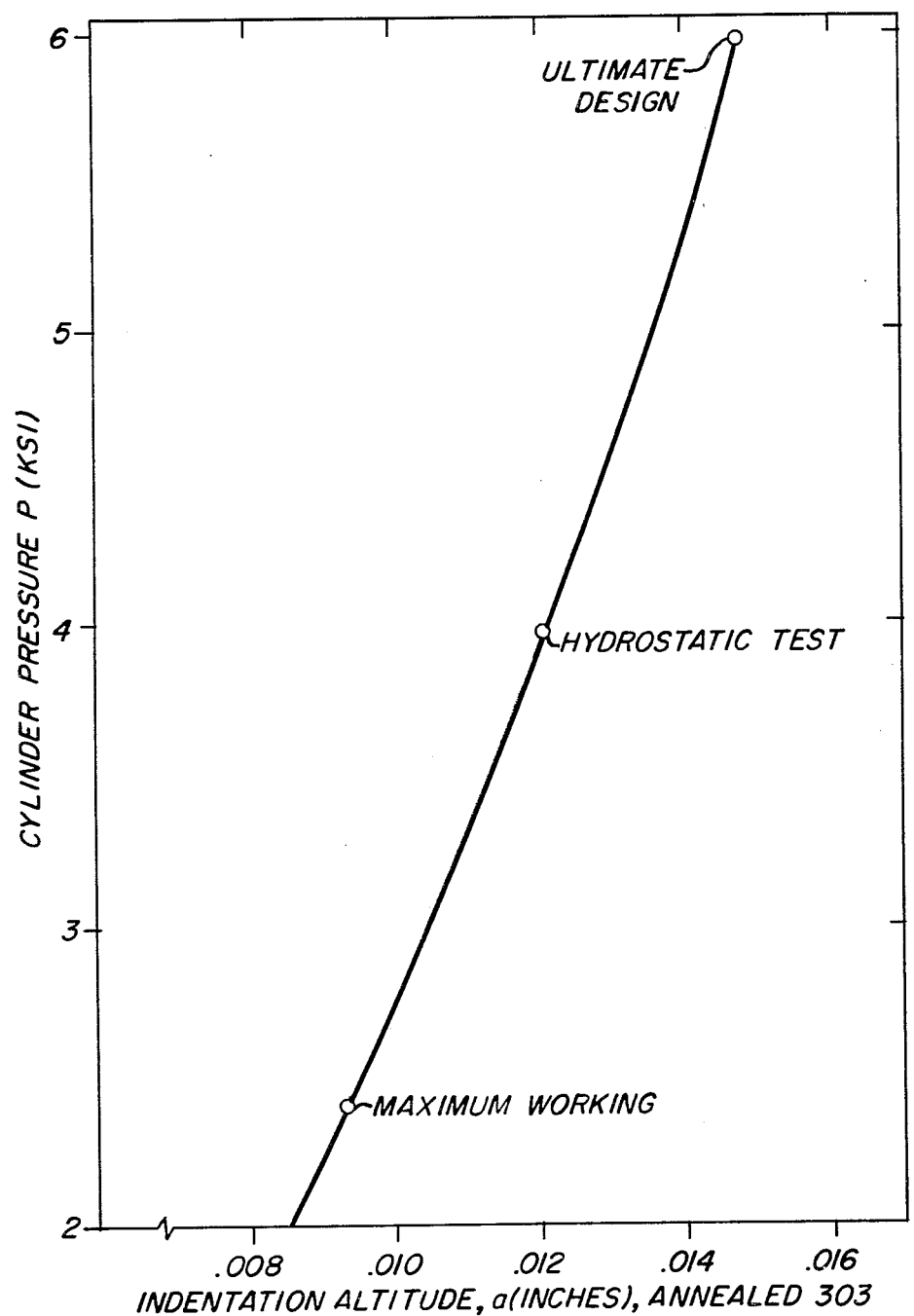
FIG. 4 is a calibration curve for indentation altitude in a sample of annealed AISI Type 303 steel.

Laboratory tests were performed to determine a material suitable for use in cylinders designed to meet Department of Transportation 3T specifications. AISI Type 303 stainless steel was selected since it is readily available in cold drawn hexagonal cross sectional shape. The steel was annealed at about 2000° F. and quenched in brine so that a hardness of Rockwell B87 was obtained. Various specimens were prepared with different finishes. Loads corresponding to 2400 psi, the maximum working pressure, 4000 psi, the hydrostatic test pressure, and 6000 psi, the ultimate design pressure, were applied to a Rockwell C brale penetrator mounted in a Universal Testing machine so as to press into the sample material. The indentor had a 120 degree conical tip. I found that the indentor should be modified to provide a 0.016 inch (0.4 mm) working altitude instead of the normal 0.011 inch and that the maximum working load should be specified as about 300 kg. The results of the test (FIGS. 3 and 4) show the relationship between pressure applied and the diameter and depth, respectively, of the sample indentations. A minimum sample finish of 32 rms peaks/microinch should be used to obtain clear and distinct readings of indentation dimensions.

I claim:

1. In an apparatus for providing a permanent indication of the maximum force attained in a system, said apparatus including a housing having a straight longitudinal passage therein, a sample of uniformly compressible material fixedly mounted in said passage, and a penetrator having an indentor forcing said sample slidably mounted in said passge, the improvement in said apparatus for measuring the maximum pressure of gas in a vessel over its service life which comprises:

said housing having an inner end exposed to the gas within said vessel and an outer end exposed to the atmosphere external thereto, the passage in said housing extending outwardly from the inner end thereof partially through said housing, said sample being mounted in said passage adjacent the outer end thereof, said penetrator being mounted in said passage adjacent the inner end thereof, means for retaining said penetrator in said passage without preventing flow of gas thereto, said penetrator being mounted in said passage with a minimum of clearance such that the axis of said penetrator remains substantially parallel to the axis of said passage during movement therealong, but in any event said clearance permitting gas from said vessel to leak along said passage to a location between said sample and the penetrator, and a vent extending from the outer end of said housing to said passage adjacent said sample so as to relieve buildup of gas pressure tending to resist movement of said penetrator toward the sample thus preventing any inaccuracy of readings which might be caused thereby.

2. The improved apparatus of claim 1 further comprising sealing means mounted about said penetrator for minimizing leakage of gas along the passage.

3. The improved apparatus of claim 1 wherein said system is a pressure vessel, and said housing is a plug mounted in the wall of said vessel.

4. The improved apparatus of claim 1 further comprising porous spacer means providing a seat for said sample at the outer end of said passage to insure free flow of gas to the vent.

* * * * *